United States Patent [19]
Cram

[11] Patent Number: 5,841,318
[45] Date of Patent: Nov. 24, 1998

[54] LOW NOISE PREAMPLIFIER FOR A MAGNETO-RESISTIVE HEAD TESTER

[75] Inventor: Robert M. Cram, Ramona, Calif.

[73] Assignee: Phase Metrics, Inc., San Diego, Calif.

[21] Appl. No.: 792,940

[22] Filed: Jan. 21, 1997

[51] Int. Cl.⁶ .............................. H03F 1/02; G11B 5/02
[52] U.S. Cl. .................................. 330/9; 360/67; 330/69
[58] Field of Search .............................. 330/9, 69, 252, 330/258; 360/67, 68

[56] References Cited

U.S. PATENT DOCUMENTS

| | | | |
|---|---|---|---|
| 4,463,272 | 7/1984 | Tucker | 330/9 X |
| 5,508,656 | 4/1996 | Jaffard et al. | 330/9 |
| 5,548,453 | 8/1996 | Sasaki et al. | 360/67 |

*Primary Examiner*—Steven Mottola
*Attorney, Agent, or Firm*—Blakely Sokoloff Taylor & Zafman

[57] ABSTRACT

The present invention relates to an apparatus and method for amplifying a signal from a MR element of a hard disk drive magnetic recording head having a DC component and an AC component. The apparatus includes an amplifier circuit that amplifies the signal. An offset corrector circuit is coupled to the amplifier circuit and generates an offset signal representative of a complement of the dc component of the signal. A circuit is coupled to the amplifier circuit and the offset corrector circuit that combines the signal and the offset signal to provide an output signal representative of the AC component of the signal.

14 Claims, 7 Drawing Sheets

LOW NOISE PREAMPLIFIER FOR A MAGNETO-RESISTIVE HEAD TESTER

BACKGROUND OF THE INVENTION

1. Field of the Invention

The present invention relates to an amplifier that amplifies a signal from a magnetoresistive element of a hard disk drive magnetic recording head.

2. Description of Related Art

Disk drives are magnetic recording devices used for the storage of information. The information is recorded on concentric tracks on either surface of one or more magnetic recording disks. The disks are rotatably mounted to a spin motor and information is accessed by means of read/write heads that are mounted to actuator arms which are rotated by a voice coil motor. The voice coil motor is excited with a current to rotate the actuator and move the heads. The read/write heads must be accurately aligned with the storage tracks on the disk to ensure proper reading and writing of information.

To accurately write and read data, it is desirable to maintain the head on the center of the track. To assist in controlling the position of the head, each sector of the disk typically contains a number of servo bits accurately located relative to the centerline of the track. The signals produced by the servo bits are typically demodulated into position offset signals which are used to determine the position of the head relative to the track, and to move the actuator arm if the head is not located on the track centerline.

Dual element transducers are increasingly utilized in hard disk drives because they are lighter than single element transducers. Dual element transducers include a single write element and a separate read element which is constructed from a magneto-resistive material. Such dual element transducers are commonly referred to as magneto-resistive ("MR") heads. When a MR head is exposed to a magnetic field, the resistance of the MR head changes. The change in resistance in the MR head is proportional to the change of magnitude of the magnetic field. A bias current is typically provided within the MR head so that the change in resistance in the MR head is detectable when it is exposed to a magnetic field.

However, this bias current also results in producing a DC voltage across the MR head, which is relatively large when compared to the small change in signal voltage. To eliminate the large DC voltage, MR pre-amplifiers are typically AC-coupled to the head signal. However, since the MR signal can be quite low in frequency, AC-coupling can introduce phase errors and increased noise. For example, an amplifier which receives the read signal typically requires a gain of approximately 2,000 (66 dB) to boost the read signal to a sufficiently large amplitude for conversion by an analog to digital converter ("ADC"). Since the gain is quite high, the noise of the amplifier must be very low and any DC offset must be removed from the output of the first stage without significantly degrading the signal to noise ratio ("SNR") of the system.

Therefore, there is a need in the art for a low noise MR pre-amplifier which includes a low noise DC offset corrector circuit for removing the DC component of the MR signal without degrading SNR.

SUMMARY OF THE INVENTION

The present invention relates to an apparatus and method for amplifying a signal from a MR element of a hard disk drive magnetic recording head having a DC component and an AC component. The apparatus includes an amplifier circuit that amplifies the signal. An offset corrector circuit is coupled to the amplifier circuit and generates an offset signal representative of a complement of the dc component of the signal. A circuit is coupled to the amplifier circuit and the offset corrector circuit that combines the signal and the offset signal to provide an output signal representative of the AC component of the signal.

DESCRIPTION OF THE PREFERRED EMBODIMENT

Figure 1:
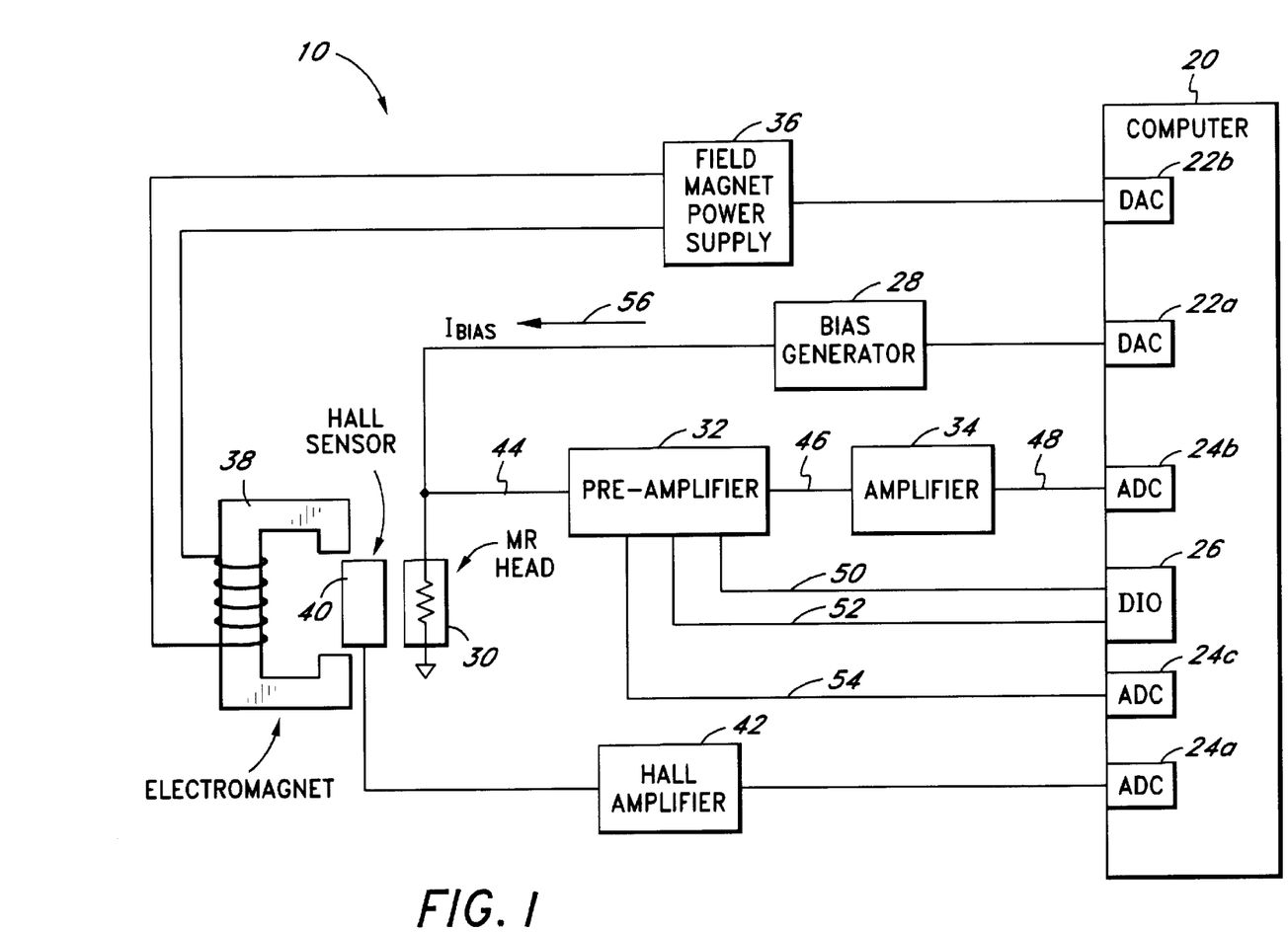
FIG. 1 is a block diagram illustrating a tester for testing a MR element of a hard disk drive magnetic recording head utilizing a pre-amplifier of the present invention.

FIG. 1 is a block diagram illustrating a tester for testing a MR element of a hard disk drive magnetic recording head utilizing a pre-amplifier of the present invention. Referring to FIG. 1, the tester 10 includes a computer 20 which provides data and control signals to various other components of the tester 10. The computer 20 is any device which processes data. The computer 20 first establishes a bias current, $I_{bias}$, in the MR element 30. In one embodiment, the computer 20 programs the bias generator 28, by way of a digital to analog converter ("DAC") 22a, to generate a bias current in the MR element 30 such that the voltage at NODE Z ranges from 0.1 to 1 VDC. The bias current generated by the bias generator 28 is typically between 1 to 30 milliamps ("mA") depending on the characteristics of the MR element 30. The bias generator 28 is servo controlled and is self-calibrating in hardware. Moreover, the bias generator 28 can be programmed to generate a positive or negative bias current in the MR element 30. Typically, the MR element 30 has an intrinsic resistance that varies between 10 to 50 ohms depending on its type.

In particular, the computer 20, by way of a DAC 22b, inputs a current waveform to a field magnet power supply 36 which establishes a corresponding field pattern in an electromagnet 38. In the preferred embodiment, the current waveform is cycled at predetermined steps to provide a field pattern of −600 oersted ("Oe") to +600 Oe. A Hall sensor 40 is placed adjacent to the MR element 30 so that the Hall sensor 40 is subjected to the same magnetic field intensity as the MR element 30. The output of the Hall sensor 40 is provided to a Hall amplifier 42 which amplifies the magnitude of the magnetic field detected. The output of the Hall amplifier 42 if provided to the computer 20 via an analog to digital converter ("ADC") 24a.

When the MR element 30 is exposed to the magnetic field generated by the electromagnet 38, its resistance changes, causing a corresponding change in the voltage across the MR element 30. Typical values of the change in voltage range from 0.5 to 5 mV. The voltage developed across the MR element 30 (NODE Z) is a composite signal which includes a DC component (created by the bias current) and an AC MR response component ("MR signal") (created by the magnetic field). The composite signal, r(t), as shown in FIG. 1, is provided to a low noise MR pre-amplifier circuit 32 of the present invention. The low noise MR pre-amplifier circuit 32 removes the DC component of the composite signal and amplifies the MR signal while minimizing noise in the signal. The MR signal is further amplified by an amplifier 34 and provided to the computer 20 via an ADC 24b. The computer 20 then examines the MR signal at periodic, predetermined intervals with respect to changes in the field pattern to determine if the MR element 30 is of acceptable quality.

Figure 2:
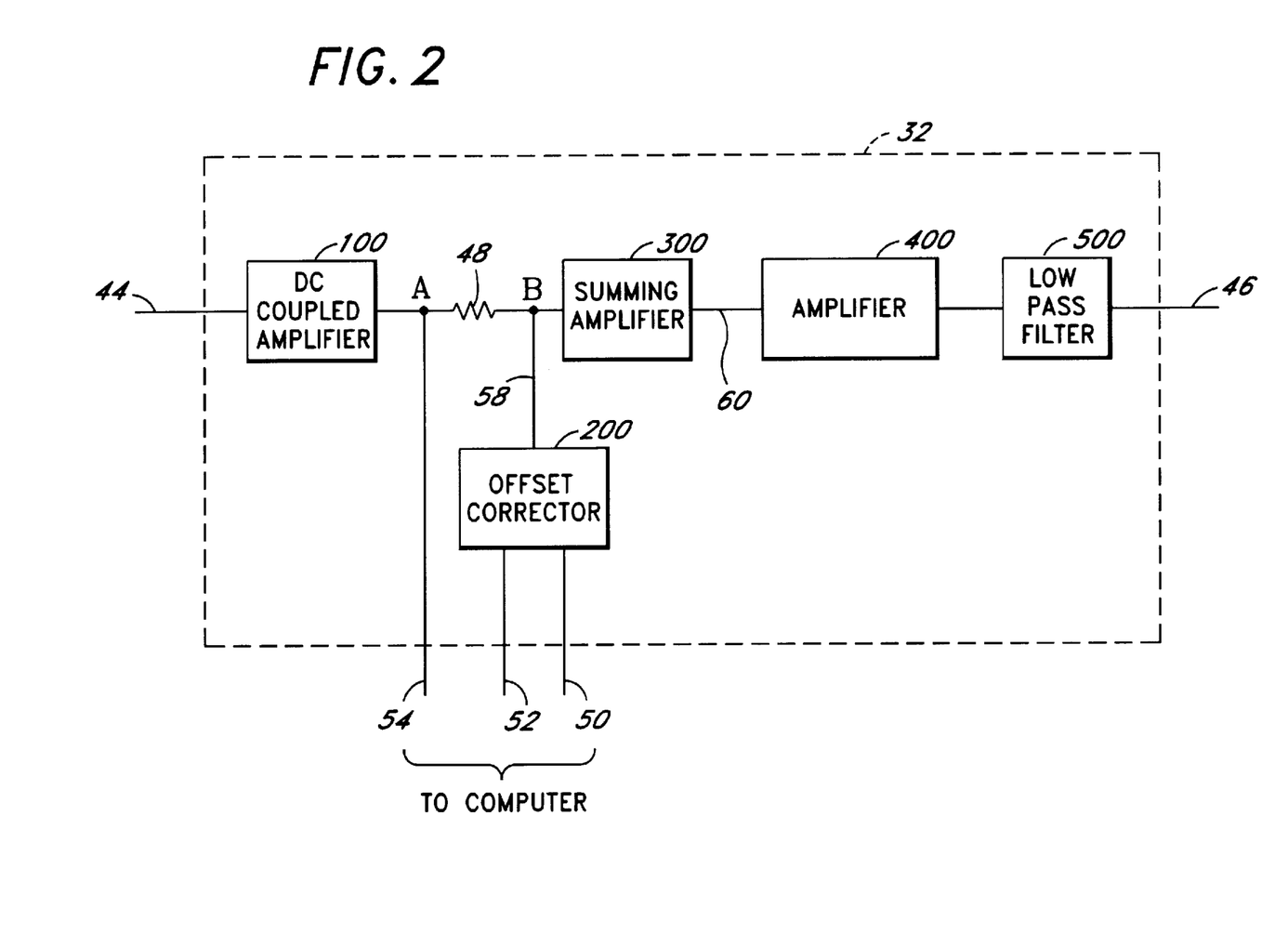
FIG. 2 is a block diagram illustrating the low noise MR pre-amplifier circuit of the present invention.

FIG. 2 is a block diagram illustrating the low noise MR pre-amplifier circuit 32 of the present invention. Referring to FIGS. 1 and 2, the signal line 44 provides the MR composite signal from the MR element 30 to a low noise DC coupled amplifier circuit 100. The output of the low noise DC coupled amplifier circuit 100 (NODE A) is coupled to an ADC 24c of the computer 20 via signal line 54. The output of the low noise DC coupled amplifier circuit 100 is also coupled to a summing amplifier circuit 300 through a resistor 48. The low noise DC coupled amplifier circuit 100 amplifies the MR composite signal and provides it to the summing amplifier circuit 300.

The output of the low noise DC coupled amplifier circuit 100 is also coupled to a low noise offset corrector circuit 200 via resistor 48. The low noise offset corrector circuit 200 provides an offset correction current which is controlled by the computer 20 via control and data buses 50 and 52. The output of the summing amplifier circuit 300 contains only the MR signal, as the DC component of the MR composite signal is removed by the low noise offset corrector circuit 200. The MR signal is provided to an amplifier circuit 400, where the MR signal is amplified and the phase offset of the MR signal is restored. Finally, a two-pole parabolic active low pass filter circuit 500 coupled to the output of the amplifier circuit 400 is used to limit the bandwidth of the MR signal (typically to 20 KHz), thus further limiting the noise of MR signal.

Figure 3:
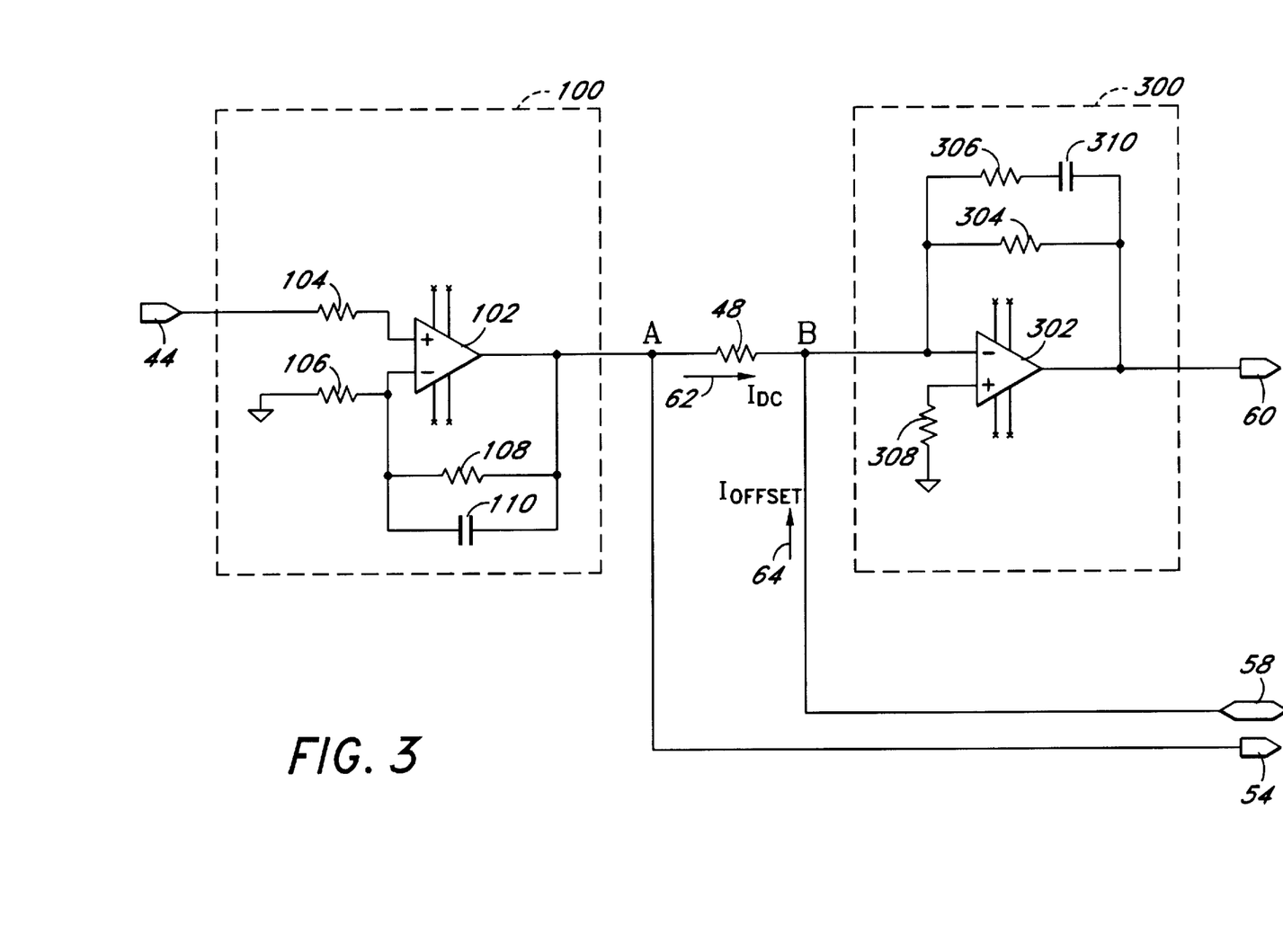
FIG. 3 is a detailed schematic illustrating one embodiment of the low noise DC-coupled amplifier circuit and the summing amplifier circuit of FIG. 2.

FIG. 3 is a detailed schematic illustrating one embodiment of the low noise DC coupled amplifier circuit 100 and the summing amplifier circuit 300 of FIG. 2. Referring to FIG. 3, the low noise DC coupled amplifier circuit 100 comprises amplifier 102, which is coupled to the signal line 44 through a resistor 104 at its non-inverting terminal. The signal line 44 provides the MR composite signal to the low noise DC coupled amplifier circuit 100. The inverting terminal of the amplifier 102 is coupled to ground through resistor 106. The output of the amplifier 102 (NODE A) is coupled to its inverting terminal through the parallel combination of resistor 108 and capacitor 110 which provides the feedback for the low noise DC coupled amplifier circuit 100. As thus configured, the voltage gain of the low noise DC coupled amplifier circuit 100 is $(1+R_{108}/R_{106})$. In the preferred embodiment, with $R_{108}=301\Omega$ and $R_{106}=33.2\Omega$, the gain of the low noise DC coupled amplifier circuit 100 is approximately 10.

The output of the low noise DC coupled amplifier circuit 100 is coupled to the input of the summing amplifier circuit 300 (NODE B) through resistor 48. The signal line 54 couples NODE A to the computer 20 through the ADC 24c. The computer 20 detects the voltage, $V_A$, provided via signal line 54. Since the bias current and the gain of the low noise DC coupled amplifier circuit 100 are known, the resistance of the MR element 30 is determined at the specified magnetic field.

Continuing to refer to FIG. 3, the summing amplifier circuit 300 comprises amplifier 302, which is coupled to ground through resistor 308 at its non-inverting terminal. The input of the summing amplifier circuit 300 (NODE B) is coupled to the inverting terminal of the amplifier 302. The output of the amplifier 302 is coupled to its inverting terminal through the parallel combination of capacitor 310 and series resistor 306 and resistor 304 to provide the feedback of the summing amplifier circuit 300. The output of the amplifier 302 is also coupled to the input of the amplifier circuit 400 through signal line 60. As thus configured, the voltage gain of the summing amplifier 300 is $(-R_{304}/R_{48})$. In the preferred embodiment, with $R_{304}=4.99$ K$\Omega$ and $R_{48}=2$ K$\Omega$, the gain of the summing amplifier circuit 300 is -2½, the negative sign indicating that the output voltage is out of phase with respect to the input voltage by 180°.

In order to remove the DC component of the MR composite signal, the low noise offset corrector circuit 200 of FIG. 2 is summed into the summing amplifier circuit 300 by way of signal line 58. The offset correction current, $I_{offset}$, flowing through signal line 58 is programmable by the computer 20 to provide a positive or negative offset correction current (depending on the polarity of the bias current generated by the bias generator 28). The low noise offset corrector circuit 200 is described in more detail below.

Figures 4, 4A:
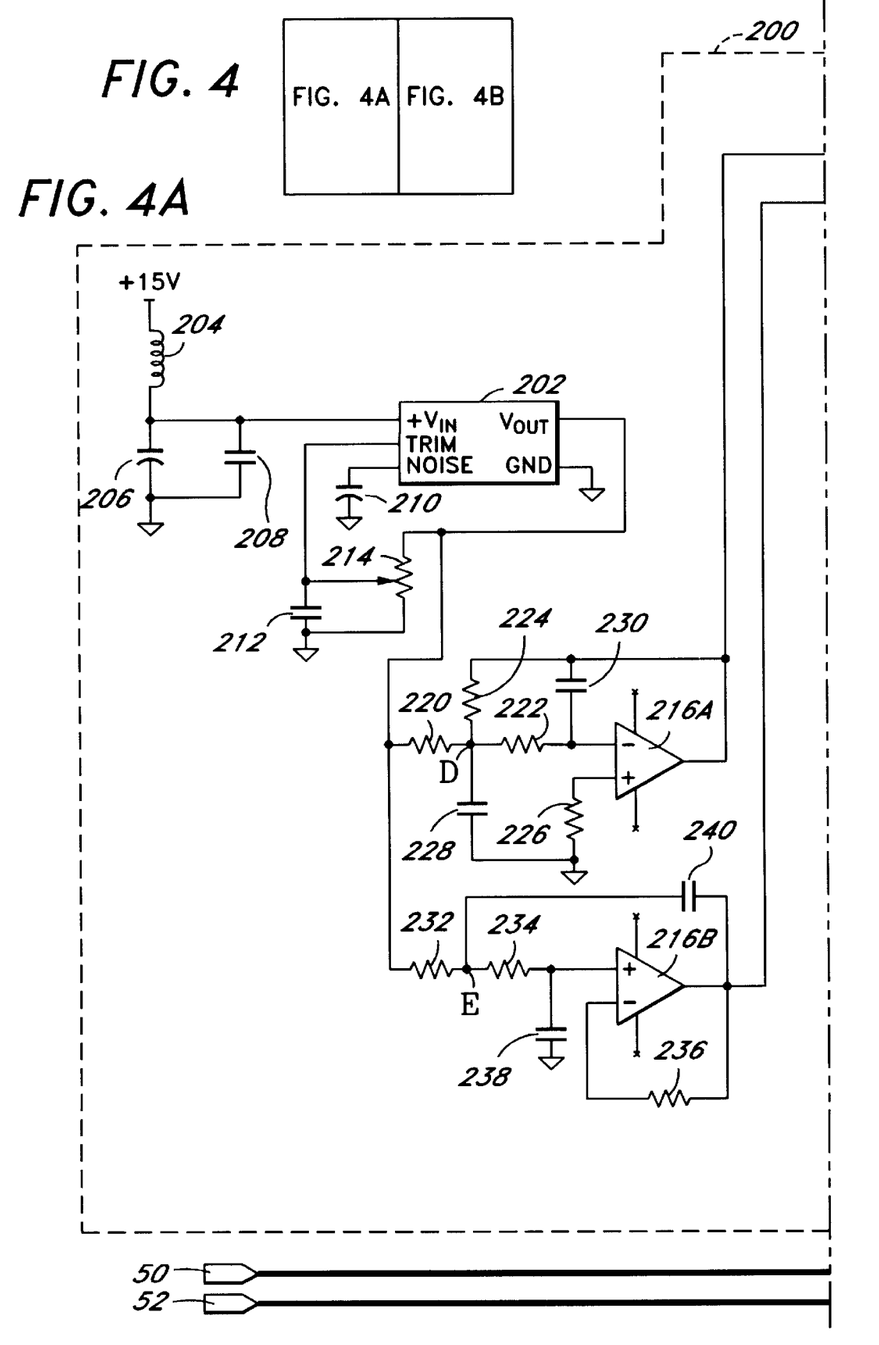
FIGS. 4,4A and 4B are detailed schematics illustrating one embodiment of the low noise offset corrector circuit of FIG. 2.
Figure 4B:
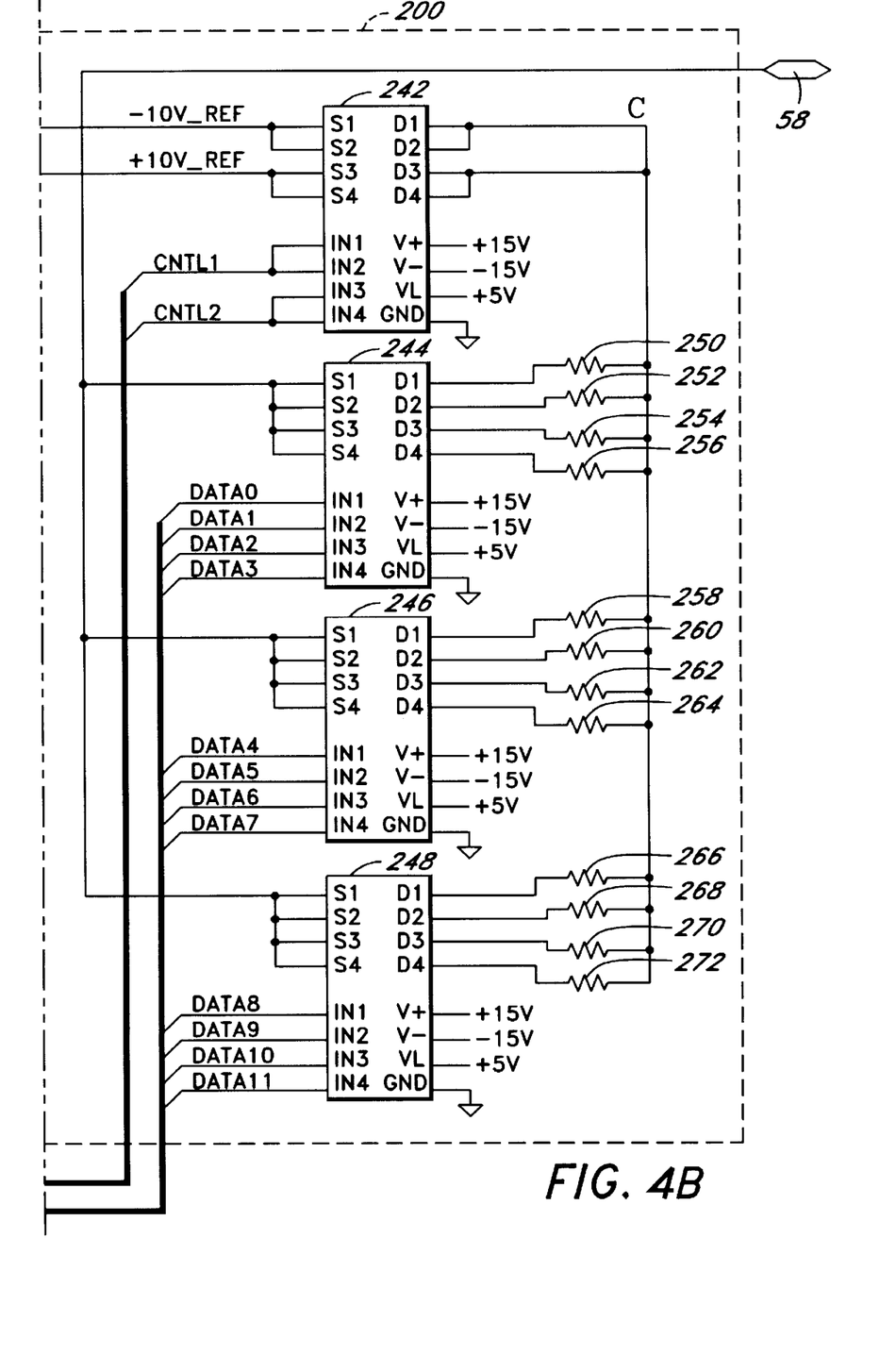

FIG. 4 is a detailed schematic illustrating one embodiment of the low noise offset corrector circuit 200 of FIG. 2. The low noise offset corrector circuit 200 comprises a low noise precision reference 202 and signal conditioning circuitry 204–214 which provides a low noise precision reference voltage. In a preferred embodiment, the low noise precision reference 202 is an Analog Devices ™ AD587 and generates a 10 V low noise precision reference voltage. The output of the low noise precision reference 202 is coupled to a precision low pass inverting filter circuit 216A and signal conditioning circuitry 220–230. The low noise precision reference voltage is provided to the inverting terminal of the amplifier 216A through series resistors 220 and 222. The output of the amplifier 216A is coupled to NODE D through resistor 224 and to its inverting terminal through capacitor 230. NODE D and the non-inverting terminal of the amplifier 216A are coupled to ground through capacitor 228 and resistor 226 respectively. The precision low pass inverting filter circuit 216A and signal conditioning circuitry 220–230 has a gain of −1 and limits the bandwidth to 5 Hz.

Continuing to refer to FIG. 4, the output of the low noise precision reference 202 is also coupled to the precision low pass non-inverting filter circuit 216B and signal conditioning circuitry 232–240. The low noise precision reference voltage is provided to the non-inverting terminal of the amplifier 216B through series resistors 232 and 234. The non-inverting terminal of the amplifier 216B is coupled to ground through capacitor 238. The output of the amplifier 216B is coupled to NODE E through capacitor 240 and is coupled to its inverting terminal through resistor 236. The precision low pass non-inverting filter circuit 216B and conditioning circuitry 232–240 has a gain of 1 and also limits the bandwidth to 5 Hz. The low noise +10 V and −10 V precision reference voltages allow for a positive or negative offset correction depending on the polarity of the bias current.

The output of the precision low pass inverting filter circuit 216A and signal conditioning circuitry 220–230 is coupled to first and second inputs of a single pole throw ("SPST") switch device 242 and the output of the precision low pass non-inverting filter circuit 216B and signal conditioning circuitry 232–240 is coupled to third and fourth inputs of the SPST switch device 242. The outputs of the SPST switch device 242 (NODE C) are coupled together and to a R–2R resistor network (resistors 250–272 and SPST switch devices 244–248) that generates an offset correction current in a manner similar to a current output DAC. In the preferred embodiment, SPST switch devices 242–248 are DG411DY analog switches, although other switches may be used in lieu thereof.

The computer 20 is coupled to the SPST switch device 242 via control bus 50. The computer selects either the 10 V or −10 V low noise precision reference voltage to be applied to NODE C based on the polarity of the bias current. By way of example, if the computer 20 programs the bias generator 28 to provide a positive bias current, then the computer 20, via control bus 50, provides the −10 V reference to NODE C, thus providing a negative offset correction. Alternatively, if the computer 20 programs the bias generator 28 to provide a negative bias current, then the computer 20 applies the +10 V reference to NODE C, thus providing a positive offset correction.

Computer 20 is coupled to the SPST switch devices 242–248 via data bus 52. The computer 20 programs the offset correction current, $I_{offset}$, by loading values on the data bus 52 (data lines DATA0–DATA11). By way of example, with $R_{272}$=3.83 KΩ, if an offset correction current of 2.6 mA is needed, the computer 20 loads a hexadecimal value of 800 h on the data bus 52. Only D4 is coupled to S4 of SPST switch device 248 and all other switches of SPST switch devices 244–248 are open. As a result, the low noise offset corrector circuit 200 generates a 2.6 mA (10 V/3.83 KΩ) offset correction current. The offset correction current is summed into the summing amplifier 300 along with the MR composite signal (which includes the DC component and MR signal). The output of the summing amplifier 300 then contains only the MR signal as the DC component of the MR composite signal is removed by the (complementary) offset correction current, $I_{offset}$, generated by the low noise offset corrector circuit 200.

Figure 5:
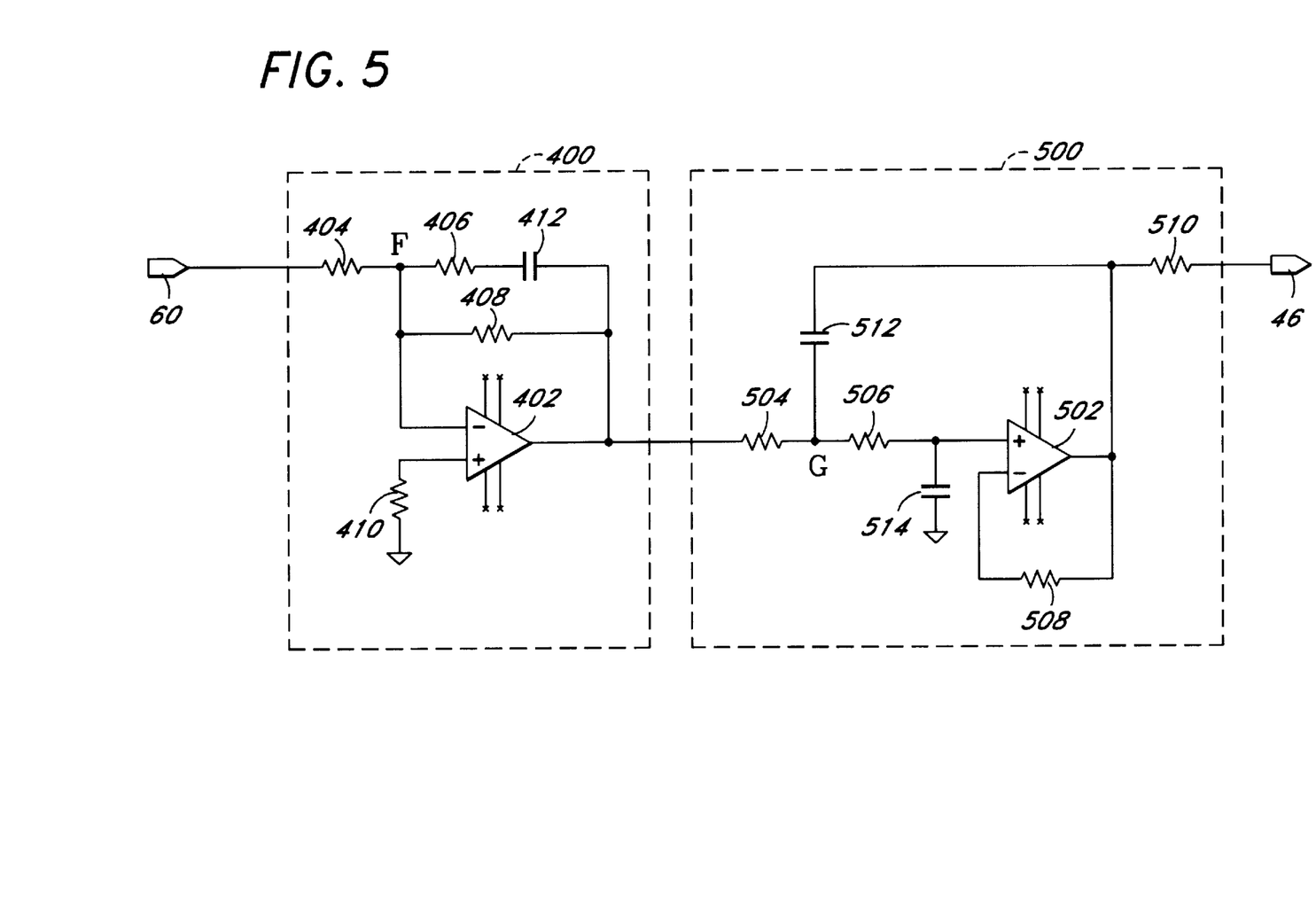
FIG. 5 is a detailed schematic illustrating one embodiment of the amplifier circuit and the two pole parabolic low noise amplifier circuit of FIG. 2.

FIG. 5 is a detailed schematic illustrating one embodiment of the amplifier circuit 400 and the two-pole parabolic active low pass filter circuit 500 of FIG. 2. Referring to FIG. 5, signal line 60 couples the output of the summing amplifier circuit 300 (not shown) to the inverting terminal of amplifier 402 through resistor 404. The output of amplifier 402 is coupled to its inverting terminal through the parallel combination of capacitor 412 and series resistor 406 and resistor 408 to provide feedback for the amplifier circuit 400. The non-inverting terminal of amplifier 402 is coupled to ground through resistor 410. The voltage gain of the amplifier circuit 400 is $(-R_{408}/R_{404})$. In the preferred embodiment, with $R_{408}$=8.08 KΩ and $R_{404}$=1 KΩ, the gain of the amplifier circuit 400 is −8, the negative sign indicating that the output voltage is out of phase with respect to the input voltage by 180°. In combination, the summing amplifier circuit 300 and the amplifier circuit 400 amplify and restore the phase of the MR signal.

Continuing to refer to FIG. 5, the two-pole parabolic active low pass filter circuit 500 includes amplifier 502 with its non-inverting terminal coupled to the output of the amplifier circuit 400 through series resistors 504 and 506. The non-inverting terminal of the amplifier 502 is also coupled to ground through capacitor 514. The output of the amplifier 502 is coupled to NODE G through capacitor 512 and to the inverting terminal through resistor 508. Signal line 46 couples the output of the amplifier 502 to amplifier circuit 34 of FIG. 1 through resistor 510. The two-pole parabolic active low pass filter circuit 500 has a unity gain and limits the bandwidth of the MR signal (typically to 20 KHz), thus further reducing the noise of the MR signal. The total gain of the low noise MR pre-amplifier circuit 32 (circuits 100, 300, and 400) is 10×−5/2×−8=200. In the preferred embodiment, each of amplifiers 102, 302, 402, and 502 is an Analog Devices™ AD797 Operational Amplifier.

Figure 6:
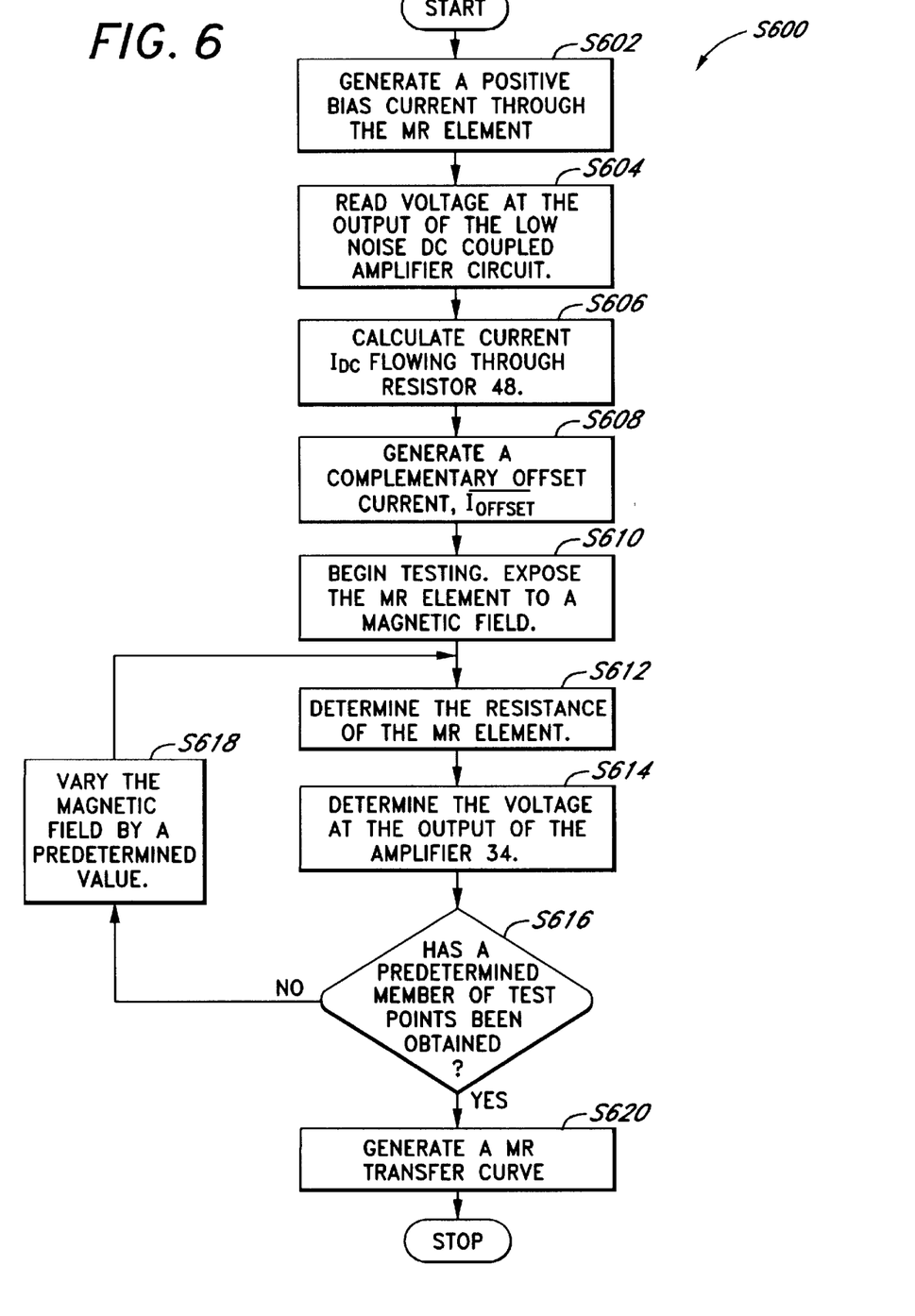
FIG. 6 is a flow diagram illustrating one method of programming the low noise offset corrector circuit and testing the MR element using the low noise MR pre-amplifier circuit of the present invention.

FIG. 6 is a flow diagram illustrating one method of programming the low noise offset corrector circuit 200 and testing the MR element using the low noise MR pre-amplifier circuit 32 of the present invention. All of the process steps S600 of the programming method as shown in FIG. 6 are implemented in tester 10 of FIG. 1. The method commences with computer 20 generating a positive bias current, $I_{bias}$, through the MR element 30 (Step S602). The direction of $I_{bias}$ is shown by the arrow 56 in FIG. 1 which causes a positive voltage at NODE Z. The computer 20 reads the voltage, $V_A$, at the output of the low noise DC coupled amplifier circuit 100 (NODE A) of FIG. 3 (Step S604). Voltage $V_A$ is the voltage across the MR element 30 multiplied by the gain of the low noise DC coupled amplifier circuit 100, which, in the preferred embodiment, is 10. The computer 20 computes $I_{DC}$, the current flowing through resistor 48 (Step S606). $I_{DC}$ is equal to $V_A$ minus $V_B$ divided by $R_{48}$, which in the preferred embodiment is 2 KΩ. However, $V_B$ is 0 V (virtual ground) because the voltage at the positive terminal of the amplifier 302 is 0 V. Thus, since a positive bias current $I_{bias}$ causes a positive voltage, $V_A$, the direction of $I_{DC}$ is shown by the arrow 62 in FIG. 3.

With the value of $I_{DC}$ computed, the computer 20 programs the low noise offset corrector circuit 200 to generate an offset correction current, $I_{offset}$ (Step S608). The value of $I_{offset}$ is equal to the value of $I_{DC}$. The computer 20 generates values on the data bus 52 (data lines DATA0–DATA11) which corresponds to the value of $I_{DC}$. The programming of $I_{offset}$ is analogous to the manner in which a current output DAC is programmed. It must be noted that since the direction of $I_{DC}$ is from NODE A to NODE B, the direction of $I_{offset}$ must be programmed to flow in the opposite direction of the arrow 64 shown in FIG. 3. That is, the low noise offset corrector circuit 200 must be programmed to generate a negative $I_{offset}$. The computer 20 programs the SPST switch device 242, via control bus 50, such that the −10 V voltage reference at the first and second inputs of the SPST switch device 242 is coupled to NODE C. As such, the offset corrector current, $I_{offset}$, is established in order to remove the DC component of the MR composite signal. It must be noted that in Step S602, the computer 20 could have programmed the bias generator 28 to generate a negative $I_{bias}$. The process steps in FIG. 6 would have been the same except that in Step S608 the computer 20 would program the SPST switch device 242 to couple the +10 V reference to NODE C, thus causing the low noise offset corrector circuit 200 to generate a positive $I_{offset}$.

Continuing to refer to FIG. 6, the field magnet power supply 36 and the electromagnet 38 generate a field pattern under control of the computer 20. The magnetic field induces a resistance change in the MR element 30 (Step S610). The computer 20 reads the voltage at NODE A, $V_A$ (Step S612). The voltage $V_A$ at NODE A is the MR composite signal and includes the DC component (generated by the bias current) and the MR signal (generated by the magnetic field). Since the value of $I_{bias}$, $V_A$, and the gain of the low noise DC coupled amplifier circuit 100 is known, the computer 20 can determine the resistance of the MR element 30. This value is plotted against the magnetic field strength which the MR element 30 is exposed to.

The computer 20 reads the MR signal, $V_{mr}$, at the output of amplifier 34 via the ADC 24b (Step S614). This value is also plotted against the magnetic field strength. Then, a determination is made as to whether a predetermined number of test points has been obtained (Step S616). If not, the magnetic field is varied by a predetermined amount (Step S618) and control passes to Step S612. In one embodiment, the predetermined value is +10 or −10 Oe. Although, any value may be used in lieu thereof. If a predetermined number of test points has been obtained, control passes to Step S620, where a MR transfer curve is generated. The first axis of the MR transfer curve is the magnetic field strength while the second axis is either the resistance of the MR element or the MR signal at the output of the amplifier 34.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for amplifying a signal generated by a magneto-resistive transducer, the signal having an ac component and a dc component, comprising:
   an amplifier circuit to amplify the signal;
   an offset corrector circuit coupled to said amplifier circuit, said offset corrector circuit including,
      a reference circuit to generate a voltage reference,
      a filter circuit coupled to said reference circuit to filter said voltage reference, and
      a resistor summing network coupled to said filter circuit to generate an offset signal based on said voltage reference and a predetermined input signal, said offset signal being representative of a complement of the dc component of the signal; and
   a circuit coupled to said amplifier circuit and said offset corrector circuit to subtract said offset signal from the signal and to provide an output signal representative of the ac component of the signal.

2. An apparatus for amplifying a signal generated by a magneto-resistive transducer, the signal having an ac component and a dc component comprising:
   an amplifier circuit to amplify the signal;
   an offset corrector circuit coupled to said amplifier circuit, said offset corrector circuit to generate an offset signal representative of a complement of the dc component of the signal; and
   a circuit coupled to said amplifier circuit and said offset corrector circuit to subtract said offset signal from the signal and to provide an output signal representative of the ac component of the signal, said output signal having a magnitude equal to the signal and a phase that is shifted from the phase of the signal by a predetermined amount.

3. The apparatus of claim 1 wherein said circuit is a summing amplifier circuit.

4. An apparatus for amplifying a signal generated by a magneto-resistive transducer, the signal having an ac component and a dc component, comprising:
   an amplifier circuit to amplify the signal;
   an offset corrector circuit coupled to said amplifier circuit, said offset corrector circuit to generate an offset signal representative of a complement of the dc component of the signal;
   a circuit coupled to said amplifier circuit and said offset corrector circuit to subtract said offset signal from the signal and to provide an output signal representative of the ac component of the signal; and
   a second amplifier circuit coupled to said circuit, said second amplifier circuit to amplify and restore the phase of the signal.

5. The apparatus of claim 4 further comprising a low pass filter circuit coupled to said second amplifier circuit, said low pass filter circuit to limit the bandwidth of the output signal.

6. The apparatus of claim 5 wherein the signal has a positive polarity.

7. The apparatus of claim 5 wherein the signal has a negative polarity.

8. An apparatus for amplifying a signal generated by a magneto-resistive transducer, the signal having an ac component and a dc component, comprising:
   an amplifier circuit to amplify the signal;
   an offset corrector circuit coupled to said amplifier circuit, said offset corrector circuit including,
      a reference circuit to generate a voltage reference,
      a filter circuit coupled to said reference circuit to filter said voltage reference, and
      a resistor summing network coupled to said filter circuit to generate an offset signal based on said voltage reference and a predetermined input signal; and
   a circuit coupled to said amplifier circuit and said offset corrector circuit to combine the signal and said offset signal and provide an output signal representative of the ac component of the signal.

9. An apparatus for amplifying a signal generated by a magneto-resistive transducer, the signal having an ac component and a dc component, comprising:
   an amplifier circuit to amplify the signal;
   an offset corrector circuit coupled to said amplifier circuit, said offset corrector circuit to generate an offset signal representative of a complement of the dc component of the signal; and
   a circuit coupled to said amplifier circuit and said offset corrector circuit to combine the signal and said offset signal and provide an output signal representative of the ac component of the signal, said output signal having a magnitude equal to the signal and a phase that is shifted from the phase of the signal by a predetermined amount.

10. The apparatus of claim 8 wherein said circuit is a summing amplifier circuit.

11. An apparatus for amplifying a signal generated by a magneto-resistive transducer, the signal having an ac component and a dc component, comprising:
   an amplifier circuit to amplify the signal;
   an offset corrector circuit coupled to said amplifier circuit, said offset corrector circuit to generate an offset signal representative of a complement of the dc component of the signal;
   a circuit coupled to said amplifier circuit and said offset corrector circuit to combine the signal and said offset signal and provide an output signal representative of the ac component of the signal; and
   a second amplifier circuit coupled to said circuit, said amplifier circuit to amplify and restore the phase of the signal.

12. The apparatus of claim 11 further comprising a low pass filter circuit coupled to said second amplifier circuit, said low pass filter circuit to limit the bandwidth of the output signal.

13. The apparatus of claim 12 wherein the signal has a positive polarity.

14. The apparatus of claim 12 wherein the signal has a negative polarity.

* * * * *